United States Patent
Kasza

(10) Patent No.: US 11,729,217 B2
(45) Date of Patent: Aug. 15, 2023

(54) SYSTEM AND METHOD FOR DETERMINING KEYSTROKES IN SECURE SHELL (SSH) SESSIONS

(71) Applicant: Corelight, Inc., San Francisco, CA (US)

(72) Inventor: Anthony Kasza, San Francisco, CA (US)

(73) Assignee: CORELIGHT, INC., San Francisco, CA (US)

( * ) Notice: Subject to any disclaimer, the term of this patent is extended or adjusted under 35 U.S.C. 154(b) by 99 days.

(21) Appl. No.: 17/211,675

(22) Filed: Mar. 24, 2021

(65) Prior Publication Data

US 2022/0311802 A1 Sep. 29, 2022

(51) Int. Cl.
| | |
|---|---|
| H04L 67/08 | (2022.01) |
| H04L 29/06 | (2006.01) |
| H04L 29/08 | (2006.01) |
| H04L 9/40 | (2022.01) |
| G06F 11/30 | (2006.01) |
| G06F 11/34 | (2006.01) |
| H04L 67/50 | (2022.01) |

(52) U.S. Cl.
CPC .......... *H04L 63/18* (2013.01); *G06F 11/3006* (2013.01); *G06F 11/3438* (2013.01); *H04L 63/0861* (2013.01); *H04L 63/16* (2013.01); *H04L 67/08* (2013.01); *H04L 67/535* (2022.05)

(58) Field of Classification Search
CPC ... H04L 63/18; H04L 67/535; H04L 63/0861; H04L 67/08; G06F 11/3006; G06F 11/3438
See application file for complete search history.

(56) References Cited

U.S. PATENT DOCUMENTS

| | | | |
|---|---|---|---|
| 5,870,399 A | 2/1999 | Smith | |
| 8,056,129 B2* | 11/2011 | Gusler | G06F 21/316 |
| | | | 726/4 |
| 9,473,380 B1 | 10/2016 | Bermudez et al. | |
| 10,104,207 B1 | 10/2018 | Rougier | |
| 10,135,847 B2* | 11/2018 | Althouse | H04L 67/01 |
| 10,200,259 B1 | 2/2019 | Pukish et al. | |
| 10,326,789 B1* | 6/2019 | Vines | H04L 67/02 |

(Continued)

OTHER PUBLICATIONS

"Measurement and Classification of Humans and Bots in Internet Chat"—Gianvecchio et al, The College of William and Mary, Dept. of Computer Science, Dec. 1, 2008 https://www.usenix.org/legacy/event/sec08/tech/full_papers/gianvecchio/gianvecchio_html/index.html (Year: 2008).*

(Continued)

*Primary Examiner* — Randy A Scott
(74) *Attorney, Agent, or Firm* — Manatt, Phelps & Phillips, LLP

(57) ABSTRACT

A system and method for determining human keystrokes in a secure shell (SSH) session from SSH session data traffic provides insight and evidence of an intrusion into a computer network. In one embodiment, the presence of human keystroke(s) in an SSH session may be inferred using a sensor appliance. In one embodiment, the SSH data traffic is encoded in a vector, one or more communication patterns are identified in the vector and the presence of human keystrokes may be inferred from the one or more communication patterns.

25 Claims, 12 Drawing Sheets

(56) References Cited

U.S. PATENT DOCUMENTS

| | | | |
|---|---|---|---|
| 11,165,675 | B1 | 11/2021 | Piet |
| 11,436,310 | B1* | 9/2022 | Tenaglia ............... G06F 21/552 |
| 2009/0197681 | A1 | 8/2009 | Krishnannoorthy et al. |
| 2011/0173198 | A1 | 7/2011 | Malleshaiah et al. |
| 2011/0320816 | A1* | 12/2011 | Yao ......................... G06F 21/57 |
| | | | 713/176 |
| 2014/0019609 | A1 | 1/2014 | Williams et al. |
| 2015/0215429 | A1 | 7/2015 | Weisblum et al. |
| 2015/0256528 | A1* | 9/2015 | Turgeman ............. H04L 67/535 |
| | | | 726/28 |
| 2017/0076256 | A1 | 3/2017 | Castel et al. |
| 2017/0093675 | A1 | 3/2017 | Chuang et al. |
| 2019/0356564 | A1 | 11/2019 | Kaneko et al. |
| 2020/0028771 | A1 | 1/2020 | Wong et al. |
| 2020/0210871 | A1 | 7/2020 | Alperovich et al. |
| 2020/0351191 | A1 | 11/2020 | Lin et al. |
| 2020/0389469 | A1 | 12/2020 | Litichever et al. |
| 2021/0105304 | A1 | 4/2021 | Kraning et al. |
| 2021/0185066 | A1 | 6/2021 | Shah et al. |

OTHER PUBLICATIONS

"Identifying Legitimate Web Users and Bots with Different Traffic Profiles—an Information Bottleneck Approach"—Suchacka et al, Science Direct, Knowledge-Based Systems, Jun. 7, 2020 https://www.sciencedirect.com/science/article/pii/S0950705120302318 (Year: 2020).*

Draper-Gil et. al.; "Characterization of Encrypted and VPN Traffic using Time-related Features", Proceedings of the 2nd International Conference on Information Systems Security and Privacy (ICISSP 2016), Conference Paper dated Feb. 2016, pp. 407-414, 9 pages.

Niemczyk et al.; "Identification over encrypted Channels", HP DVLabs, Jul. 1, 2014, 12 pages. https://raw.githubusercontent.com/bniemczyk/pacumen/master/paper/pacumen.pdf.

GGFAST: A General Framework for Building Network Traffic Classifiers, ACM SIGCOMM 2021, 16 pages.

Yuan et al.; "An SVM-based machine learning method for accurate internet traffic classification", Springer Science + Business Media, LLC 2008, 8 pages.

Zander et al.; "Automated Traffic Classification and Application Identification using Machine Learning", Centre for Advanced Internet Architectures Swinburne University of Technology, Melbourne, Australia, Proceedings of the IEEE Conference on Local Computer Networks 30th Anniversary (LCN'05), 2005 IEEE, 8 pages.

Wang et al.; "Unknown Pattern Extraction for Statistical Network Protocol Identification", School of Information Technology, Deakin University, Melbourne, Australia, 40th Annual IEEE Conference on Local Computer Networks, LCN 2015, downloaded on Mar. 2, 2021, 4 pages.

Lin et al.; "Application classification using packet size distribution and port association", Journal of Network and Computer Applications, Elsevier Ltd., Received Nov. 7, 2007, Received in revised form Mar. 3, 2009, Accepted Mar. 3, 2009, 8 pages.

Bernaille et al.; "Traffic classification on the fly", Universite' Pierre et Marie Curie—Paris VI, Thomson Paris Lab, Computer Communication Review, Association for Computing Machinery, 2006, 36 (2), pp. 23-26., 10.1145/1129582.1129589, hal-01097551, submitted on Dec. 19, 2014, 5 pages.

Dhamankar et al.; "Protocol Identification via Statistical Analysis (PISA)", Black Hat 2007, TippingPoint Technologies, 9 pages.

Karagiannis et al.; "BLINC: Multilevel Traffic Classification in the Dark", SIGCOMM'05, Aug. 21-26, 2005, Philadelphia, Pennsylvania, USA, 12 pages.

Auld et al.; "Bayesian Neural Networks for Internet Traffic Classification", IEEE Transactions on Neural Network, vol. 18, No. 1, Jan. 2007, 18 pages.

Bernaille et al.; "Early Application Identification", Universite' Pierre et Marie Curie—LIP6, CNRS Paris, France, CONEXT '06 Lisboa, Portugal, 12 pages.

McGregor et al.; "Flow Clustering Using Machine Learning Techniques", The University of Waikato, Private BAG 3105, Hamilton, New Zealand and The National Laboratory of Applied Network Research (NLANR), San Diego Supercomputer Center, University of California San Diego, 10100 Hopkins Drive, CA92186-0505, USA, Conference Paper in Lecture Notes in Computer Science • Apr. 2004, DOI: 10.1007/978-3-540-24668-8_21 • Source: DBLP, 11 pages.

Este et al.; "Support Vector Machines for TCP Traffic Classification", DEA, Universita degli Studi di Brescia, via Branze, 38, 25123 Brescia, Italy, preprint submitted to Computer Networks, May 12, 2009, 32 pages.

Areström et al.; "Early Online Classification of Encrypted Traffic Streams using Multi-fractal Features", Linkbping University, Sweden, The definitive version is published in Proc. IEEE INFOCOM Workshop on Intelligent Cloud Computing and Networking (IEEE ICCN @INFOCOM), Paris, France, Apr./May 2019, and is available at IEEE Xplore Digital Library via http://dx.doi.org/[doi], 6 pages.

Iliofotou et al.; "Network Monitoring using Traffic Dispersion Graphs (TDGs)", IMC'07, Oct. 24-26, 2007, San Diego, California, USA, 6 pages.

Hernandez-Campos et al.; "Statistical Clustering of Internet Communication Patterns", Department of Statistics, University of North Carolina at Chapel Hill, 16 pages.

Moore et al.; "Internet Traffic Classification Using Bayesian Analysis Techniques", IGMETRICS'05, Jun. 6-10, 2005, Banff, Alberta, Canada, 11 pages.

Crotti et al.; "Traffic Classification through Simple Statistical Fingerprinting", DEA, Università degli Studi di Brescia, Italy, ACM SIGCOMM Computer Communication Review, vol. 37, No. 1, Jan. 2007, 10 pages.

Roughan et al.; "Class-of-Service Mapping for QoS: A Statistical Signature-based Approach to IP Traffic Classification", School of Mathematical Sciences, University of Adelaide, SA 5005, Australia and AT&T Labs—Research, Florham Park, NJ 07932-0971, USA, IMC'04, Oct. 25-27, 2004, Taormina, Sicily, Italy, 14 pages.

Anderson et al.; "Machine Learning for Encrypted Malware Traffic Classification: Accounting for Noisy Labels and Non-Stationarity", Cisco Systems, Inc., KDD 2017 Applied Data Science Paper, KDD'17, Aug. 13-17, 2017, Halifax, NS, Canada, 10 pages. DOI: http://dx.doi.org/10.1145/3097983.3098163.

Xie et al.; "SubFlow: Towards Practical Flow-Level Traffic Classification", University of California Riverside and Narus, Inc., The 31st Annual IEEE International Conference on Computer Communications: Mini-Conference, 5 pages.

Alizadeh et al.; "Timely Classification and Verification of Network Traffic Using Gaussian Mixture Models", Article in IEEE Access, Jan. 2020, Received Mar. 18, 2020, accepted Apr. 10, 2020, date of publication May 6, 2020, date of current version May 28, 2020, 17 pages. DOI: 10.1109/ACCESS.2020.2992556.

Moore et al.; "Toward the Accurate Identification of Network Applications", University of Cambridge and Intel Research, Cambridge, Conference Paper in Lecture Notes in Computer Science, Mar. 2005, 15 pages. (Source: DBLP) DOI: 10.1007/978-3-540-31966-5_4.

Qin et al.; "Towards a Profiling View for Unsupervised Traffic Classification by Exploring the Statistic Features and Link Pattern", NetAI '19, Aug. 23, 2019, Beijing, China. © 2019 Association for Computing Machinery, ACM ISBN 978-1-4503-6872-8/19/0 https://doi.org/10.1145/3341216.3342213.

Dreger et al.; "Dynamic Application-Layer Protocol Analysis for Network Intrusion Detection", 16 pages.

Wright et al.; "Using Visual Motifs to Classify Encrypted Traffic", Johns Hopkins University Information Security Institute Baltimore, MD 21218, VizSEC'06, Nov. 3, 2006, Alexandria, Virginia, USA, 10 pages.

Lu et al.; "High performance traffic classification based on message size sequence and distribution", Journal of Network and Computer Applications 76 (2016) 60-74, © 2016 Elsevier Ltd., Received Sep. 29, 2015; Received in revised form Apr. 21, 2016; Accepted Sep. 29, 2016Available online Oct. 15, 2016, 15 pages. http://dx.doi.org/10.1016/j.jnca.2016.09.013.

(56) References Cited

OTHER PUBLICATIONS

Shim et al.; "Application Traffic Classification using Payload Size Sequence Signature", Department of Computer and Information Science, Korea University, Sejong, South Korea, International Journal of Network Management, received Aug. 9, 2016, revised Mar. 6, 2017, Accepted Apr. 24, 2017, 17 pages. DOI: 10.1002/nem.1981.

Corelight Blog, "Databricks = Corelight—A powerful combination for cybersecurity, incident response and threat hunting", Jul. 18, 2018, 41 pages.

TaoSecurity Blog, "Port Independent Protocol Identification", Sep. 7, 2006, 11 pages.

* cited by examiner

SYSTEM AND METHOD FOR DETERMINING KEYSTROKES IN SECURE SHELL (SSH) SESSIONS

FIELD

The disclosure relates generally to determining keystrokes made during SSH sessions. The disclosed system and method may be used in several different technical fields including network security monitoring, incident response and network forensics and/or mis-use detection.

BACKGROUND

A computer network typically has one or more computer systems connected together by some type of communications path. Each computer system may execute one or more endpoint applications. For example, one type of endpoint application is a secure shell (SSH) server that can establish a SSH session with a client. It is important to be able to determine if an SSH connection is driven by a human or an automated process. The determination of whether the SSH connection is driven by a human or automated process is quite beneficial for investigating and responding to a network intrusion. For example, in a computer network where all SSH sessions are expected to be conducted by automated processes, finding an SSH session carrying keystrokes implies that the session is driven by a human and not an automated process. This implication from the keystrokes is valuable for detecting intrusions.

To find a SSH session carrying keystrokes, host-based auditing of SSH sessions is possible. However, the host-based auditing can be costly, complicated to set up, and some methods actually introduce additional security concerns. A known technique uses a statistical approach. However, the statistical approach requires input data for processing before this approach is able to make the required decision between an automated process or a human being. Furthermore, this statistical approach does not have any deep packet inspection that would be helpful.

Another known technique operates on SSH session data and attempts to identify a reverse shell session based on the sequence of packets and a response payload size that exceeds a predetermined threshold. This known technique fails to detect the keystrokes using a network sensor. This technique also likely is inefficient since it may rely on static port numbers to identify SSH connections to search for keystrokes within.

The determination of whether an SSH session contains human driven keystrokes via a network sensor simplifies the process. Thus, it is desirable to be able to determine human keystrokes in an SSH session using a network sensor that overcomes the above technical problems and limitations of known techniques and it is to this end that the disclosure is directed.

DETAILED DESCRIPTION OF ONE OR MORE EMBODIMENTS

The disclosure is particularly applicable to an sensor appliance in a computer network that can detect and identify a presence of human keystrokes in the data of an SSH session using an inference process and it is in this context that the disclosure will be described. It will be appreciated, however, that the human keystroke detection in the SSH session has greater utility since it can be implemented in other devices that can capture SSH data traffic and can identify the presence of human keystrokes. The disclosed system and method overcomes the limitations and technical problems of the above known techniques and approaches.

The disclosed system and method provides a technical solution to the above technical problem in network traffic monitoring in which the system infers the presence of human keystrokes. The disclosed system and method may be used in various contexts including network security monitoring, incident response and network forensics and/or mis-use detection. For the network security monitoring context, the determination of the presence of human keystrokes may be used to detect a network intrusion since the SSH sessions should be automated processes (no human keystrokes). Same advantage may exist for incidence response or mis-use detection.

Figure 1:
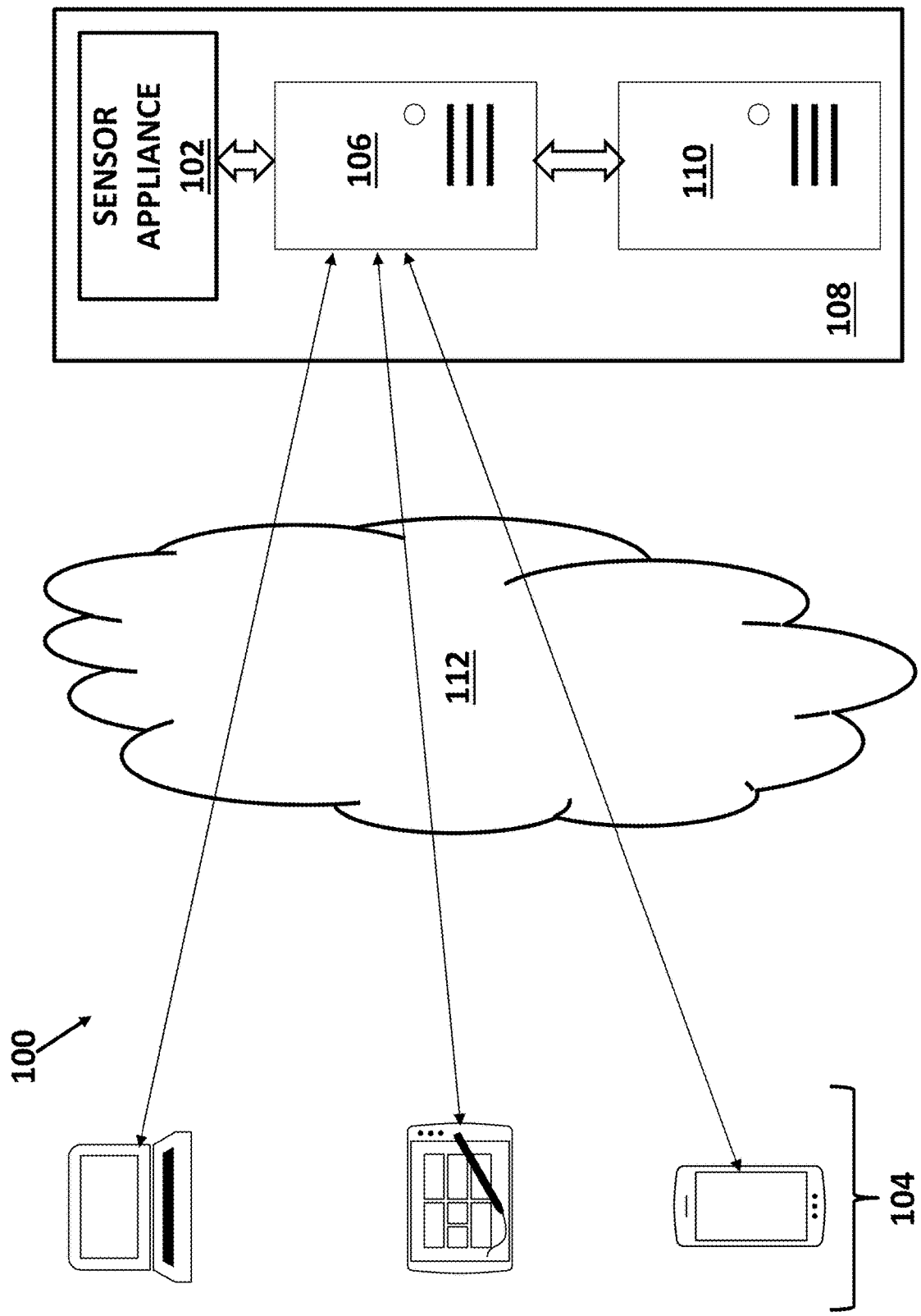
FIG. 1 illustrates a typical computer network that implements secure shell (SSH) connections that includes a sensor appliance.

FIG. 1 illustrates a typical computer network 100 that implements secure shell (SSH) connections that includes a sensor appliance 102 that can infer the presence of human keystrokes in each SSH session. In other embodiments, the ability to infer the presence of human keystrokes for an SSH session without host logs and without breaking the encryption of the SSH session may be included in other types of sensors or devices in which the data being communicated in the SSH session may be captured and analyzed. An SSH connection may be established between each client 104 and an SSH server 106 in a computer system or network 108. The SSH server 106 may be positioned before other servers and computer systems 110 in the computer system or network 108 to protect the other servers and computer systems 110 in the computer system or network 108. In the example in FIG. 1, each client may be executed on various computing resources such as a laptop computer, a tablet computer, a smartphone device (examples being shown in FIG. 1) or any other processor based computing system or device.

As shown, each SSH connection/session may be established over a communications path 112 between each client and the SSH server 106. In the system shown in FIG. 1, the sensor appliance 102 may capture the data being transferred during the SSH session and infer the authentication method as described in more detail below. The sensor appliance 102 may have at least a processor and memory and input/output ports that allow the sensor appliance 102 to intercept/capture the SSH data traffic. In addition, as shown and described below, the sensor appliance 102 may include an SSH inference module (preferably implemented as a plurality of instructions or computer code stored in memory and executed by the processor of the sensor appliance) that perform a SSH keystroke presence detection method as described below in more detail.

Figure 2:
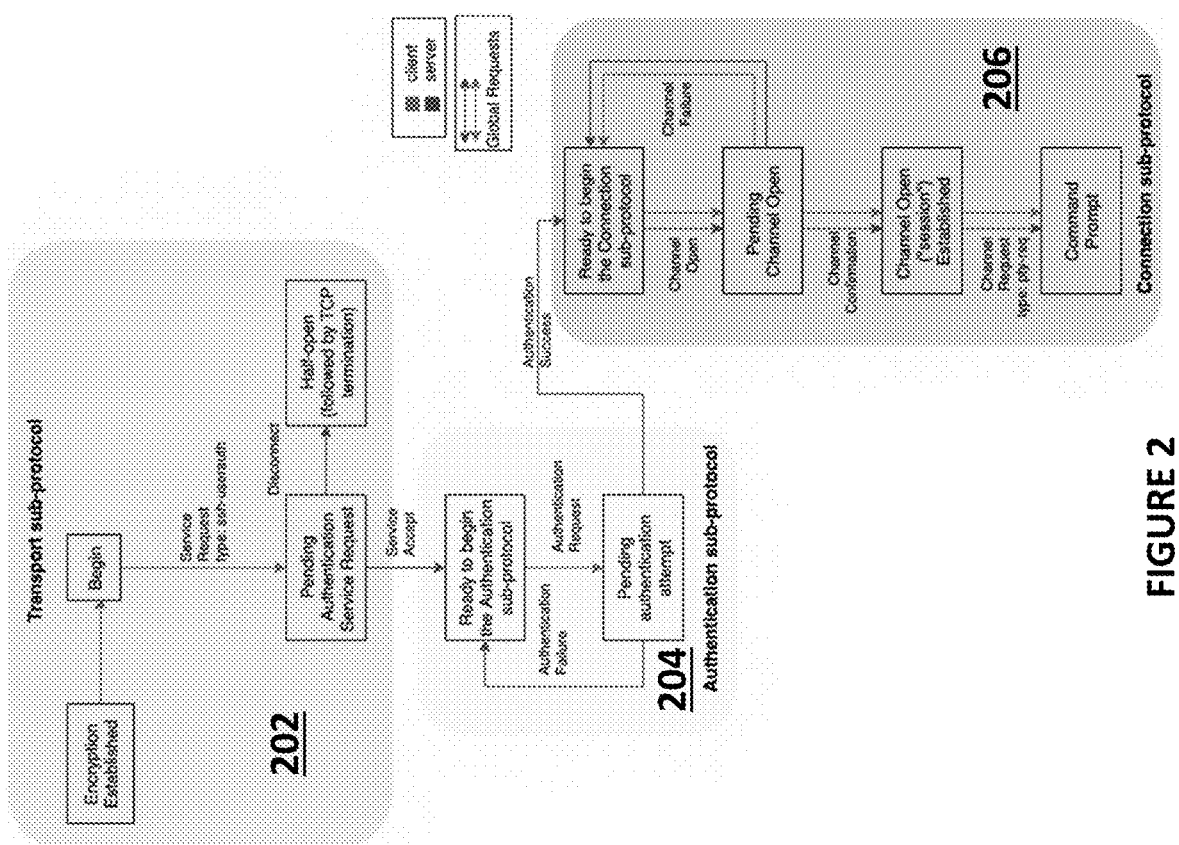
FIG. 2 illustrates a set of known sub-protocols of a known SSH session.

FIG. 2 illustrates a set of known sub-protocols of a known SSH session. In particular, each SSH session may consist of a cleartext handshake negotiations of the protocol (not shown in FIG. 2) and may then have a transport sub-protocol 202, an authentication sub-protocol 204 and a connection sub-protocol 206 wherein the connection/session transitions between the various sub-protocols as shown in FIG. 2. The various data in the sub-protocols are exchanged using a plurality of protocol data units (PDUs) wherein each PDU may be known as a message. Furthermore, one or more messages are formatted in a well known SSH packet structure. For purposes of this disclosure, the connection sub-protocol 206 will be focused on during which a presence of human keystrokes may be detected.

In the connection sub-protocol 206 of an SSH session, the SSH connection has been established and the client and server now exchange data and commands. There are a plurality of different commands and data that may be exchanged. An SSH session in a computer network between a client and a server may be either an automated process or a human involved process. In the automated process, the client and server communicate data and commands programmatically/automatically with no human involvement based on a script/code running on the client and/or server. Thus, in the automated process, no human keystrokes would be present in the SSH data traffic. In the human involved process, a human being may type commands or data thus causing human keystroke data to be part of the SSH connection sub-protocol 206. Most/all SSH sessions in a computer network are automated processes with no human involvement. As a result, these automated SSH sessions do not have any keystrokes found in the SSH session traffic data. When a SSH session has the presence of human keystrokes, it is very possible that that SSH session involves a nefarious action who is not supposed to be establishing an SSH session on the computer network. Thus, the ability to detect the presence of human keystrokes in the SSH session traffic data is an important technique to quickly identify an intrusion into the computer network that is likely not authorized and can be resolved. Furthermore, being able to detect the presence of the human keystrokes using the disclosed method eliminates the need to rely of logs which are unreliable and could be tampered with and does not require breaking the encryption of the SSH session.

Figure 3:
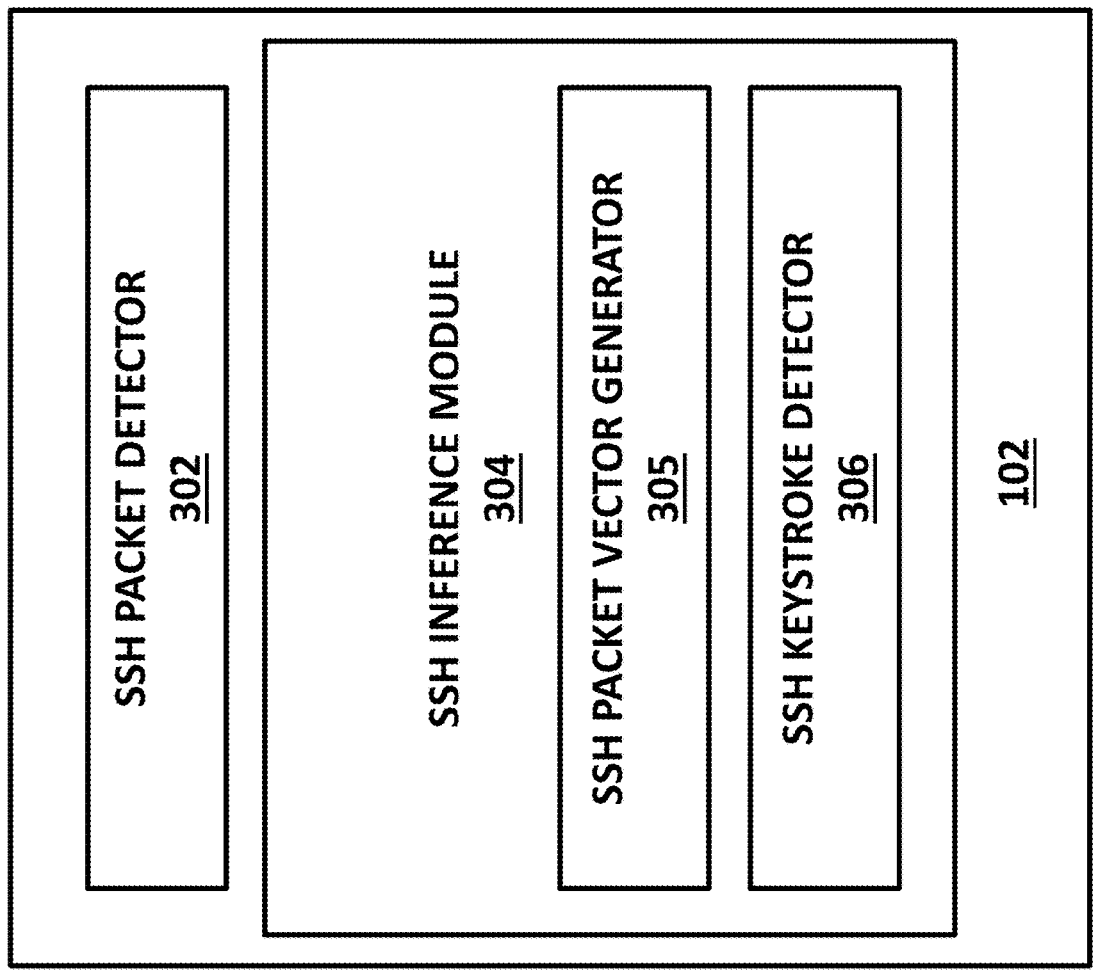
FIG. 3 illustrates more details of the SSH keystroke detector within the sensor appliance in one embodiment.

FIG. 3 illustrates more details of the SSH keystroke detector within the sensor appliance 102 for the embodiment of the system 100 in FIG. 1. It is understood that the SSH keystroke detection system and method may also be implemented on/in other devices/systems that can capture/receive the SSH data traffic and those other implementations are within the scope of the disclosure. Using the SSH keystroke detection, the system and method infer a presence of one or more human keystrokes in the SSH session data. The SSH keystroke detection allows for increased auditability of SSH connections at a single network sensor location instead of the requirement of visibility on all (potentially untrustable) endpoints. In one use case of the system and method, a network administrator can detect an intrusion (based on the human keystrokes in the SSH session) without examining the servers directly and without compromising the encryption of the SSH session.

For the embodiment in which the SSH keystroke detector is within the sensor appliance 102 and executed by the processor of the sensor appliance 102, the sensor appliance 102 may include a SSH packet detector 302 that can capture the SSH data traffic as is well known. The sensor appliance 102 may also have an SSH inference module 304 that receives the SSH data traffic and identifies the presence of human keystrokes for each SSH session based on inferences from the SSH data traffic as described in more detail below. The SSH inference module 304 further has a SSH packet vector generator 305 that generates a vector (shown and described in more detail with respect to FIGS. 4A-4D below) and an SSH keystroke detector 306 that uses the generated vector to detect communication patterns in the current SSH session data and then to infer the presence of human keystrokes for the current SSHE session data as described below with reference to FIGS. 5A and 5B. Each of the elements/modules of the sensor appliance 102 may be implemented in hardware as one or more hardware devices and/or a plurality of instructions/computer code that are executed by the processor of the sensor appliance 102.

Figure 4A:
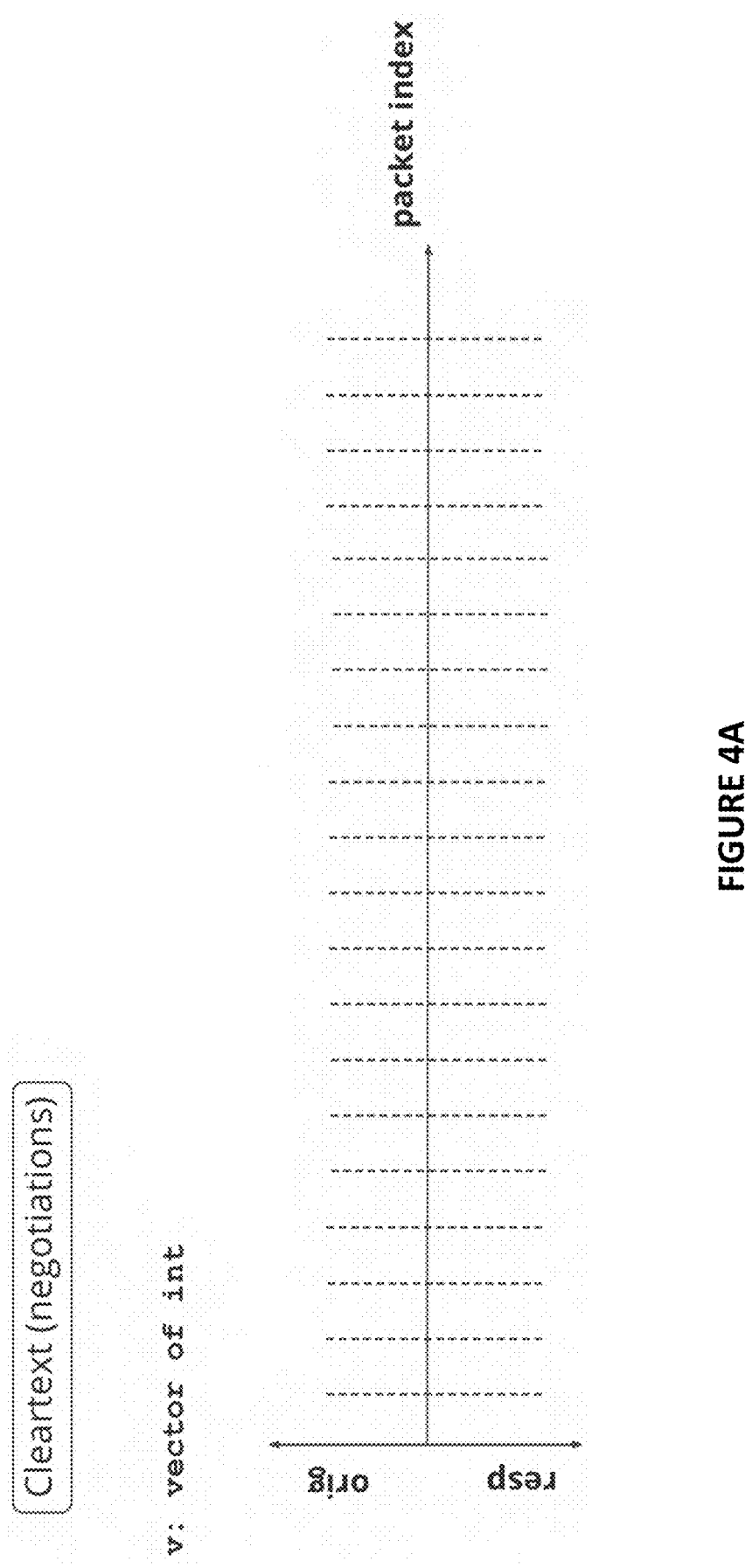
FIGS. 4A-4D illustrate an example of the messages captured/received from a SSH session.

FIGS. 4A-4D illustrate an example of the messages captured/received from a SSH session. Using the SSH packet vector generator 305, a current SSH session may be transformed into a vector of integers (as shown in FIG. 4A) in a packet index. By encoding SSH packet lengths into a vector, a TCP connection carrying an SSH session can be represented by a sequence of signed integers. These sequences are a method of encoding communication patterns between two endpoints, an SSH client and an SSH server, also referred to as a "host". In one embodiment, the encoding used for the vector is that a length of each packet in the SSH data traffic is transformed into an integer (for example, a positive (+) integer value for a packet length from the client/originator and a negative (−) integer value for a packet length from the server/responder.) In the vector, an order of the sequences is preserved using the vector indexes.

Figure 4B:
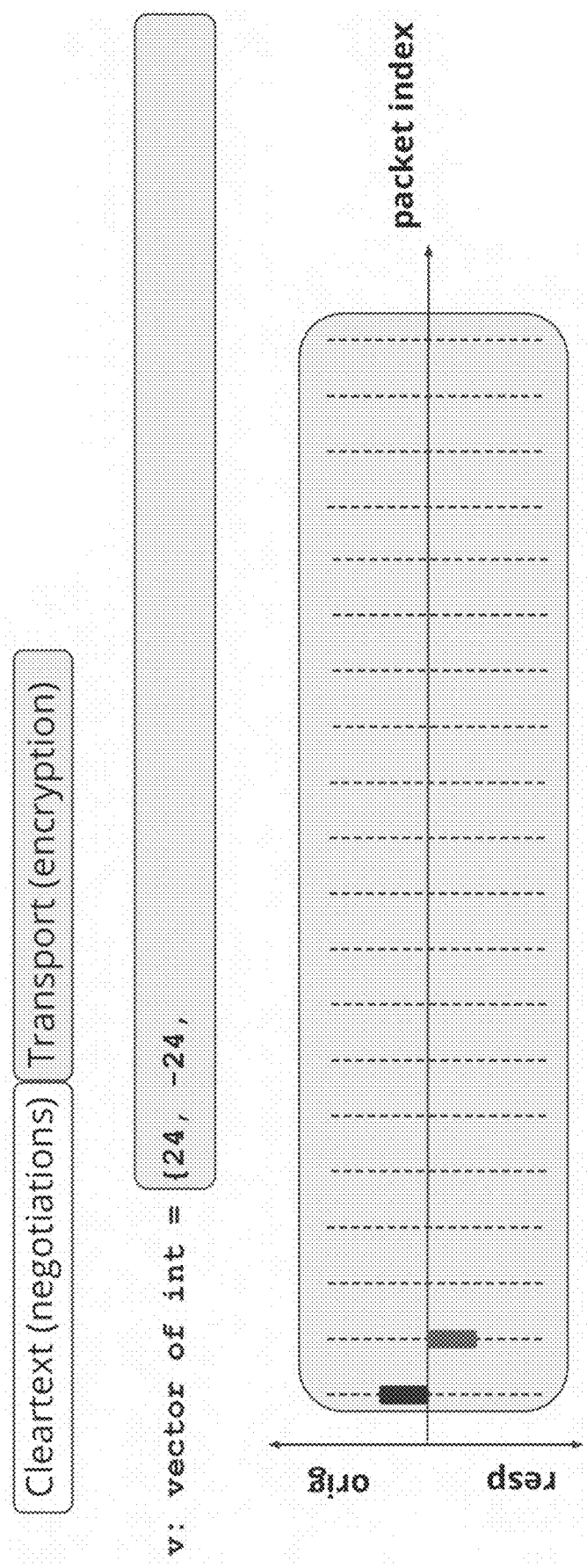
Figure 4C:
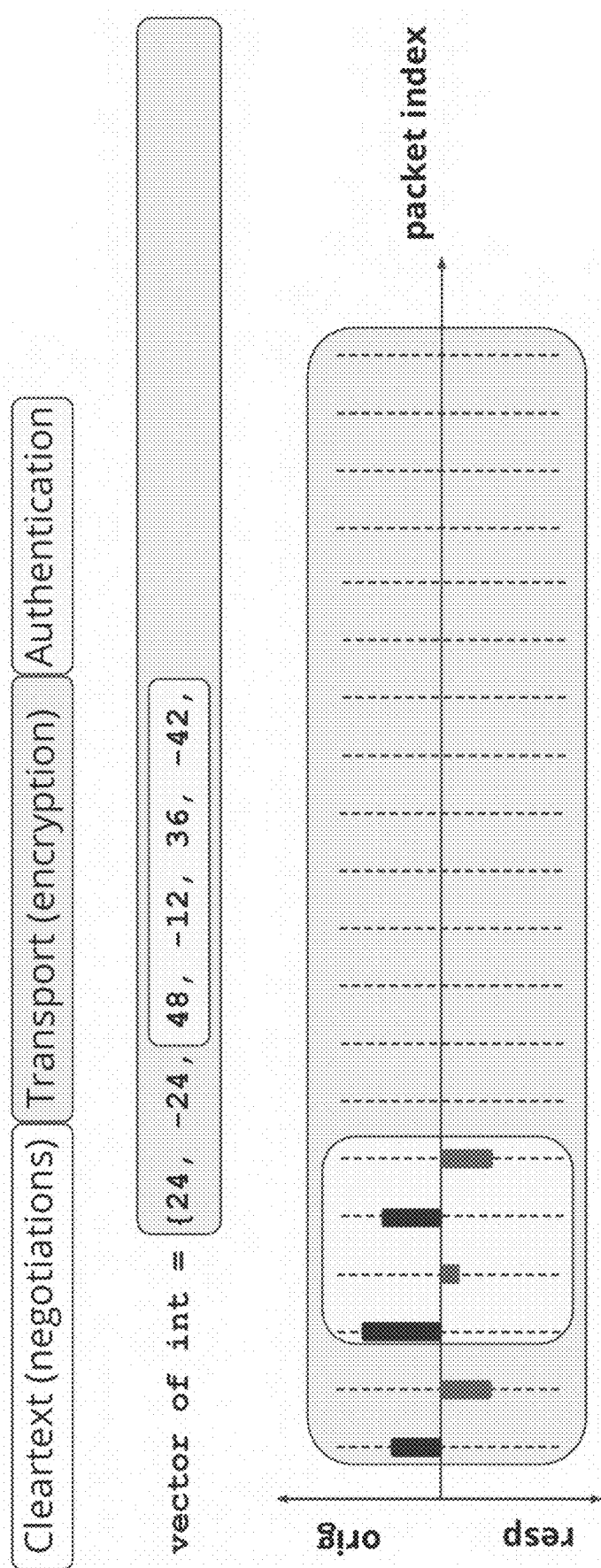
Figure 4D:
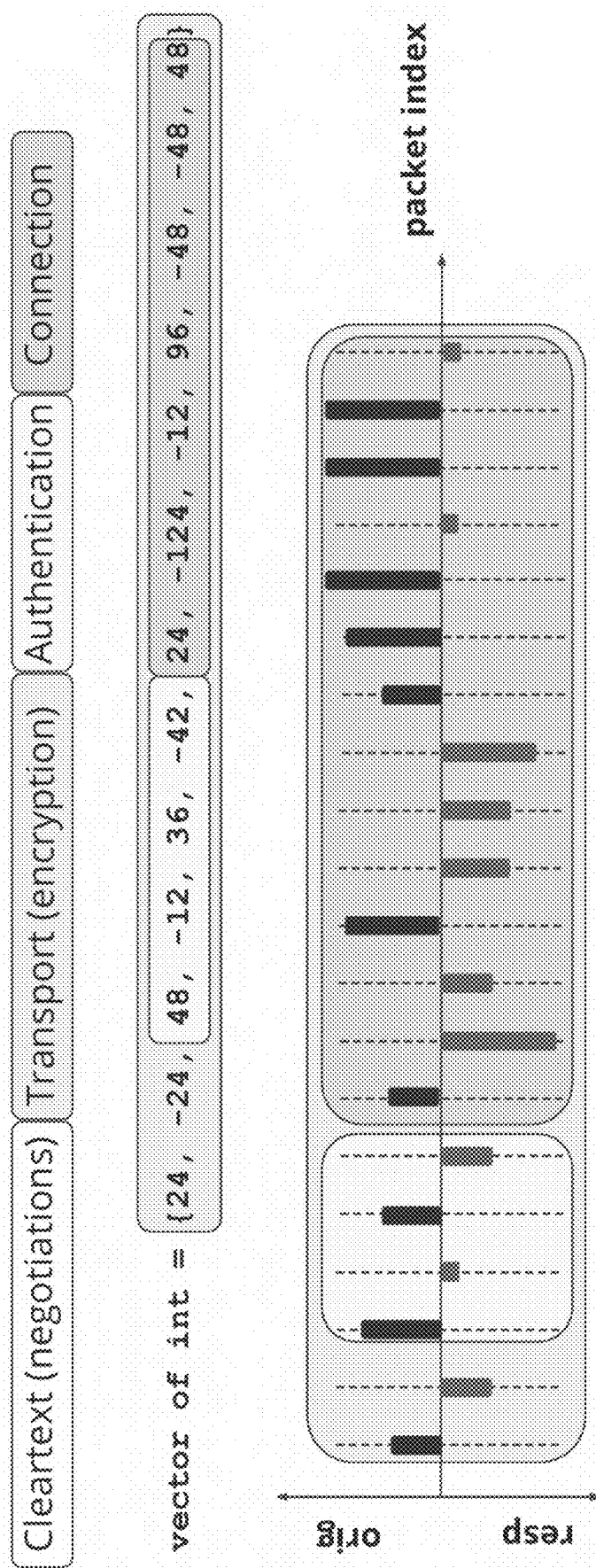

As shown in FIG. 4A, during the cleartext negotiation process no packets are stored in the vector of integers. From the transport sub-protocol, two integers are generated for the vector as shown in FIG. 4B. From the authentication sub-protocol, four integers are generated for the vector as shown in FIG. 4C. Then, from the connection sub-protocol, a plurality of integers are stored in the vector as shown in FIG. 4D. The vector for these sub-protocols may be part of the capturing of the data packets from the SSH session.

Figure 6:
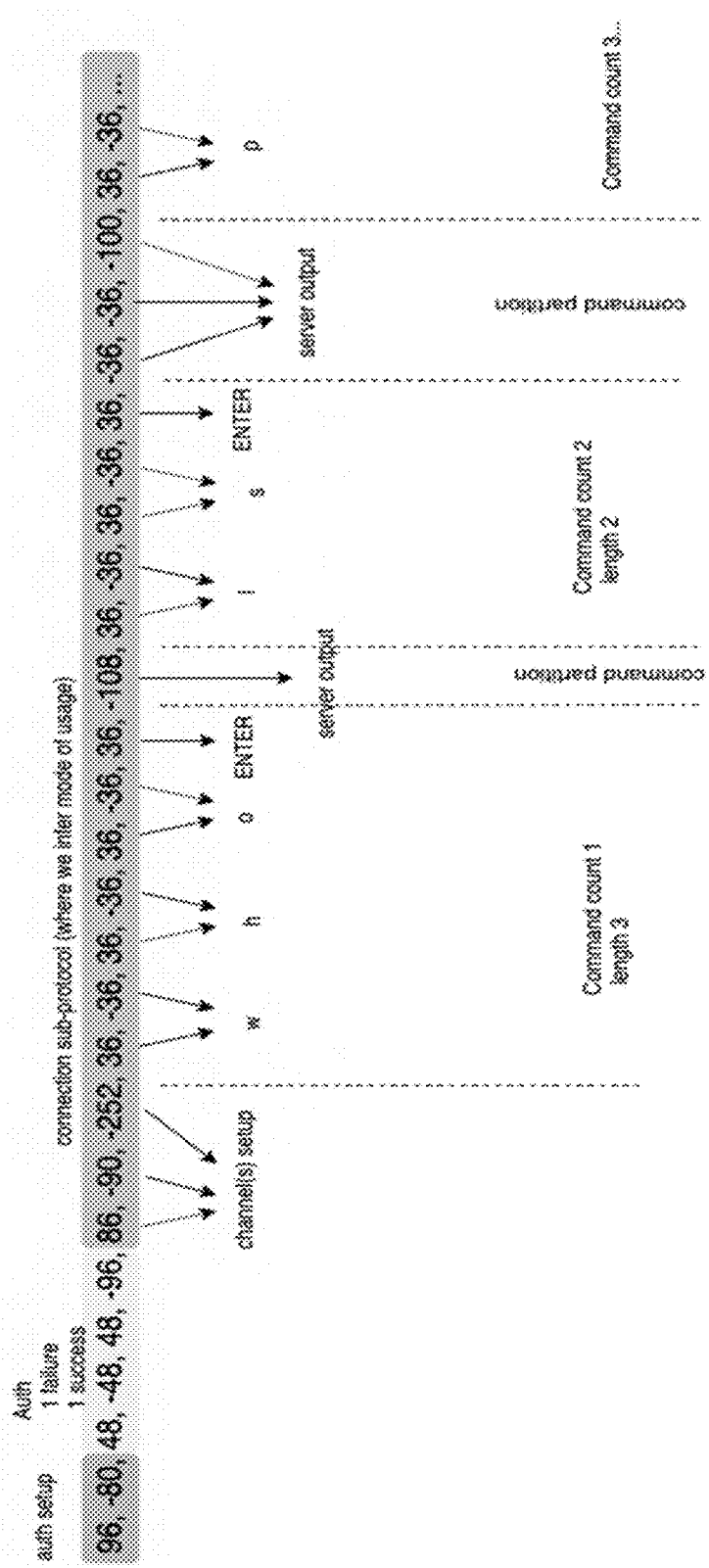
FIG. 6 illustrates an example of the keystroke determining of the system.

In the SSH sub-protocols shown in FIGS. 4A-4D (and in particular in the connection sub-protocol), the SSH data may have one or more communication patterns that may be used to infer the presence of human keystrokes as discussed in more detail below. For each sequence of packets, the one or more communication patterns may be based on the following observables of the SSH data: 1) message lengths, or sizes—the size of a message being sent from one endpoint to another; 2) message ordering—the order of the messages exchanged between the endpoints (client and server for example); 3) message timing—the interarrival deltas between messages transmitted/received; and/or 4) message directionality—which endpoint sent the message and which endpoint received the message. The above observables are from the perspective of a passive network sensor with a vantage point "between" the two endpoints so that the system and method do not rely on a log that may be corrupted/hacked and that may only show the communication from the perspective on one endpoint. An example of an annotated session containing keystrokes is shown in FIG. 6. While FIGS. 4A-4D illustrate a length of packet as the communication pattern, each of the other communication patterns or more than one of the communication patterns may be identified in a SSH session data. The presence of human keystrokes can be inferred from one or more of these communication patterns as discussed below.

Figure 5A:
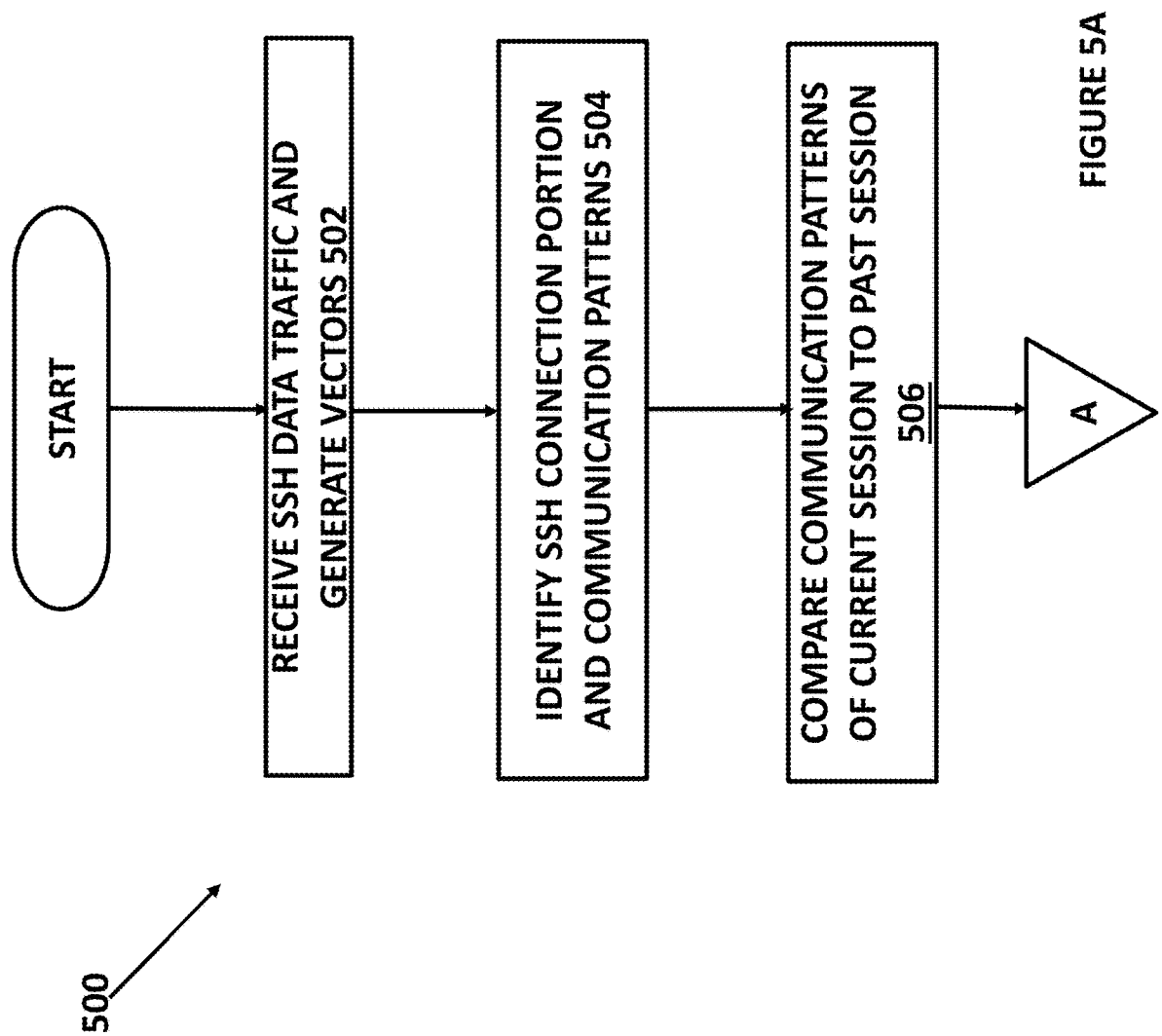
FIGS. 5A-5B illustrate a method for detecting human keystrokes in an SSH session.
Figure 5B:
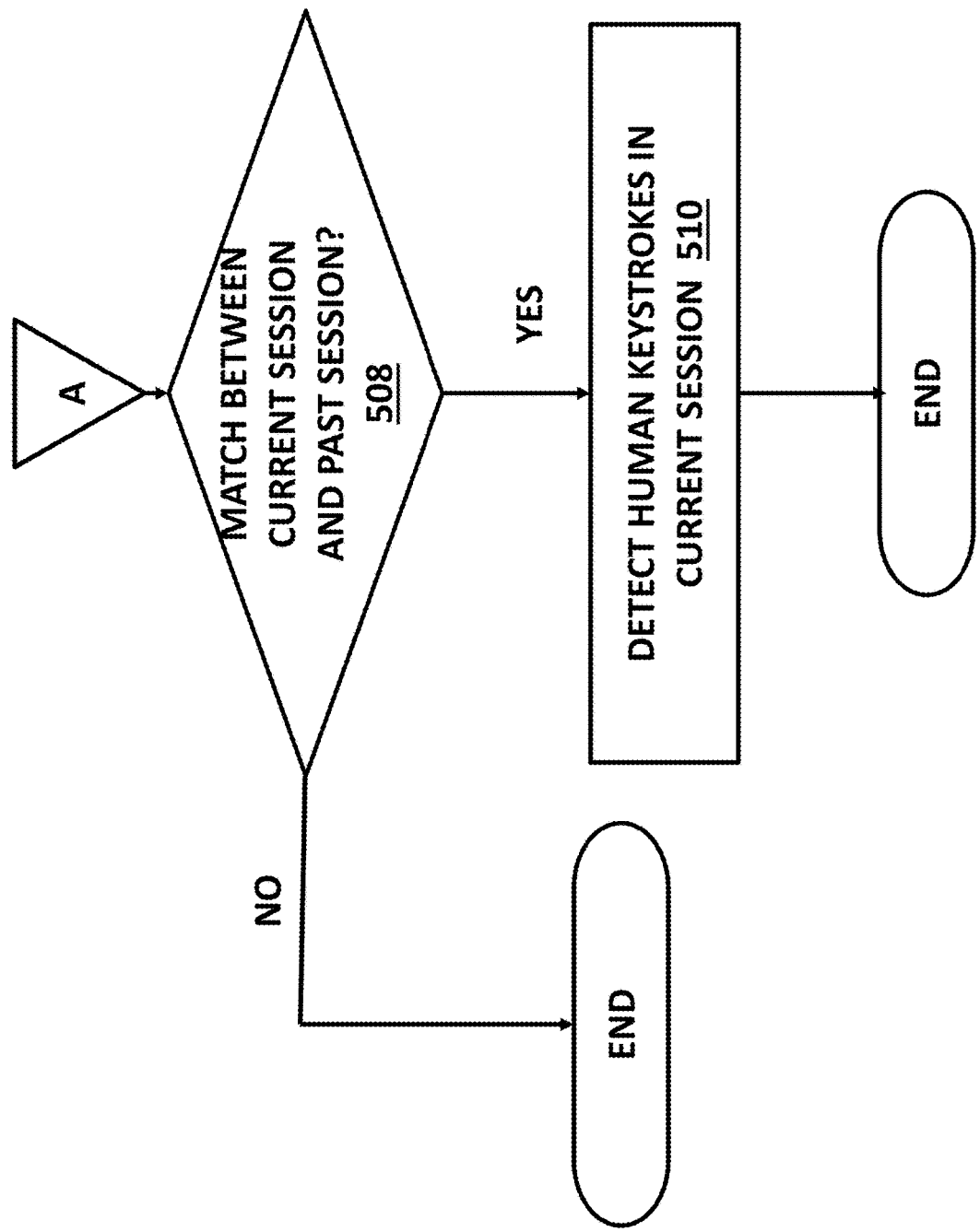

FIGS. 5A-5B illustrate a method 500 for detecting human keystrokes in an SSH session. This method can be carried out by the sensor appliance 102 in FIG. 1, but may also be carried out using other systems in which it is desirable to identify the authentication method for an SSH session. The method 500 receives the SSH data traffic 502 and the SSH data traffic may be encoded into the vector as described above. Once an SSH session is encoded as the vector, the method may scan the vector(s) for specific communication patterns indicative of specific uses of a protocol. In the case of keystroke detection, vector patterns appear mostly in the connection subprotocols of SSH as discussed above.

During the scanning of the vector(s) of the current SSH session, the method may identify the SSH connection portion of the SSH data traffic as shown above and generate the communication pattern(s) that characterize the presence of human keystrokes in the SSH data traffic. Using the vector that has been generated, one or more vector operations may be used to generate the communication pattern(s) and thus infer the authentication method for the current SSH session. For example, the method use index slicing (heads and tails), summary statistics, such as maximum, minimum, mean, range, etc.), runs and a predetermined number of occurrences (first, second, third, etc.) of a positive integer, a negative integer or a run of integers. The runs may include runs of increasing integers, runs of decreasing integers and/or runs of repeating integers.

The method may have, for prior SSH sessions that have human keystrokes, generated one or more communication pattern(s) that identify the presence of human keystrokes in each prior SSH session. These known communication pattern(s) that identify the presence of human keystrokes for each prior SSH session may be stored. Furthermore, as a new communication pattern or communication patterns are found to indicate the presence of human keystrokes, those may also be stored in the system.

Using the communication pattern(s) for the current SSH session and the store of known communication pattern(s) that identify the presence of keystrokes for each prior SSH session, the method may compare (506) the current session (and its communication patterns) to the prior SSH sessions (and their communication pattern(s) that identify the presence of keystrokes in the current session. The method may then determine if there is a match between the communication pattern(s) of the current SSH session and the communication pattern(s) of a particular prior SSH session (508). If there is a match, then the method can infer (510) the presence of keystrokes in the current SSH session. Thus, the method is able to infer the presence of keystrokes from the communication patterns of the SSH data traffic. This technical solution solves the technical problems of the known systems and does not require trying to brute force crack the encryption which is time consuming.

FIG. 6 illustrates an example of the keystroke determining of the system. FIG. 6 shows SSH traffic and the connection sub-protocol portion in which the data packets have been encoded as the vector as discussed above. As shown, the vector shows several different communication patterns with a command and its length that indicate the presence of human keystrokes in the connection sub-protocol of the SSH data.

Figure 7:
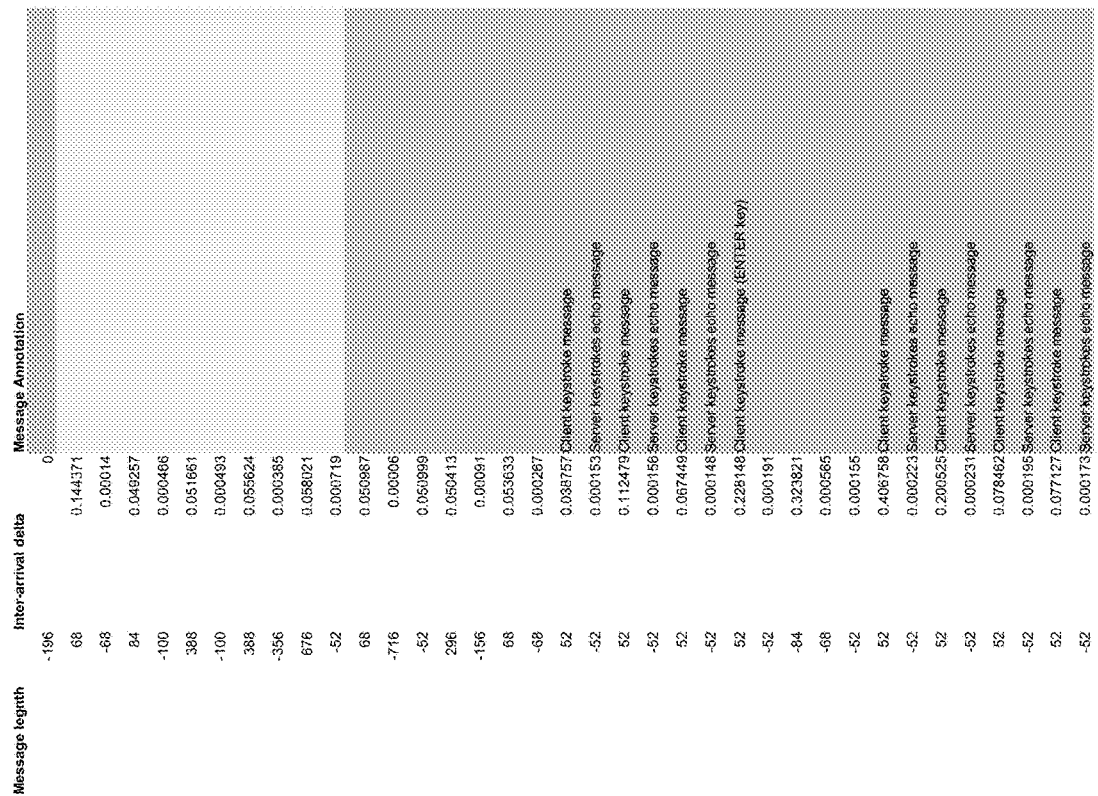
FIGS. 7 and 8 shows two example SSH sessions in which human keystrokes are detected.
Figure 8:
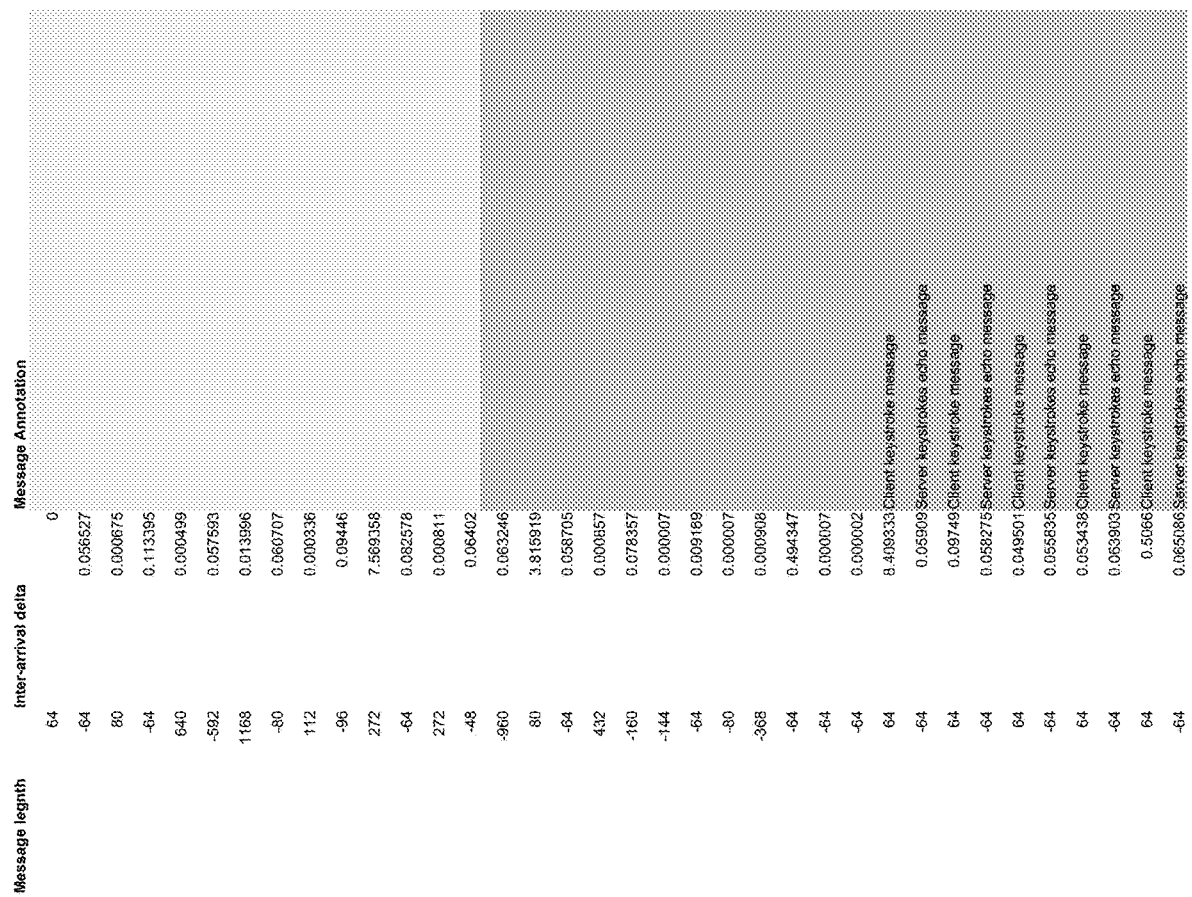

FIGS. 7 and 8 shows two example SSH sessions (including the authentication subprotocol and connection subprotocol in which human keystrokes are detected. In these examples, a far left column shows the packet vector values, a second column shows an inter-arrival delay and a third column has annotations based on the method for detecting human keystrokes. In both examples, the human keystrokes are the vector values that include the annotations. The vector values and the sequence of vector values may be determined to be human keystrokes due to the ping pong pattern between server data and client data and the echos as shown in FIGS. 7-8.

It is noted that the keystroke determiner has to distinguish between data that has the presence of human keystrokes and known keepalive messages. Thus, the method may use timing of the packets in the vector (a further communication pattern) to distinguish between the keystrokes and these keepalive messages. In one embodiment, this may be done using a timing heuristic. Specifically, the inter-arrival deltas (one type of communication pattern) of keep-alive messages will be consistent throughout an SSH connection and are often 60 time periods, such as microseconds, by default. For human driven keystrokes, inter-arrival deltas will typically be much smaller than keep-alive messages. This is because humans often type multiple keystrokes per second. Thus, inter-arrival deltas of keystrokes will vary as the human types, pauses to think, and resumes typing. Keep-alive messages will not vary through a session. Thus, using this timing heuristic, keep-alive messages can be distinguished from human keystrokes The foregoing description, for purpose of explanation, has been with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include and/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general-purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software, and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the disclosure or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the disclosure, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the system and method have been specifically described herein, it will be apparent to those skilled in the art to which the system and method pertains that variations and modifications of the various implementations shown and described herein may be made without departing from the spirit and scope of the system and method. Accordingly, it is intended that the disclosure be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

What is claimed is:

1. A method, comprising:
   receiving, by a processor, a current session secure shell (SSH) data traffic;
   identifying, by the processor, at least one communication pattern in a connection portion of the current session SSH data traffic, the at least one communication pattern being a command and a length of the command that indicate human keystrokes;
   comparing, by the processor, the at least one communication pattern of the current session SSH connection portion to a communication pattern of a stored SSH connection portion being a connection portion from a past SSH session wherein the communication pattern of the connection portion from the past SSH session indicates at least one human keystroke during the connection portion; and
   inferring, by the processor, a presence of human keystrokes in the current session SSH data traffic upon determining a match of the communication pattern of the current session SSH data traffic and the communication pattern of the past SSH session, wherein inferring the presence of human keystrokes further comprises distinguishing between presence of human keystrokes and keepalive messages.

2. The method of claim 1 further comprising encoding, by the processor, the current session SSH data traffic into a vector and identifying, by the processor, the at least one communication pattern in the vector.

3. The method of claim 2, wherein encoding the vector further comprises encoding a sequence of signed integers.

4. The method of claim 3, wherein each signed integer is a length of a packet in the current session SSH data traffic.

5. The method of claim 4, wherein encoding the vector further comprises encoding a positive integer value for a packet length of a packet from a client in the current session SSH data traffic and encoding a negative integer value for a packet length of a packet from a server in the current session SSH data traffic.

6. The method of claim 1, wherein comparing the at least one communication pattern further comprises comparing, by the processor, the at least one communication pattern of the current session SSH data traffic to a plurality of stored prior SSH sessions that each have one or more communication patterns that indicate human keystrokes.

7. The method of claim 2, wherein identifying the at least one communication pattern further comprises one of identifying a size of a packet in the vector, identifying an order of the packets in the vector, identifying a timing between packets in the vector and identifying a direction of a packet.

8. The method of claim 1 further comprising capturing, by a sensor appliance that includes the processor, the current session SSH data traffic.

9. The method of claim 1, wherein distinguishing between presence of human keystrokes and keepalive messages further comprises comparing a variance in an inter-arrival delta for human keystrokes to a constant inter-arrival delta for keepalive messages.

10. An apparatus, comprising:
    a hardware processor;
    a plurality of lines of instructions executed by the hardware processor that configure the hardware processor to:
    receive a current session secure shell (SSH) data traffic;
    identify at least one communication pattern in a connection portion of the current session SSH data traffic, the at least one communication pattern being a command and a length of the command that indicate human keystrokes;
    compare the at least one communication pattern of the current session SSH data traffic to a communication pattern of a stored SSH session being a past SSH session wherein the communication pattern from the past SSH session indicates at least one human keystroke present in the past SSH session; and
    infer that human keystrokes are present in the current session SSH data traffic upon determining a match of the communication pattern of the current session SSH data traffic and the communication pattern of the past SSH session, wherein inferring the presence of human keystrokes further comprises distinguishing between the presence of human keystrokes and keepalive messages.

11. The apparatus of claim 10, wherein the hardware processor is further configured to encode the current session SSH data traffic into a vector and to identify the at least one communication pattern in the vector.

12. The apparatus of claim 11, wherein the hardware processor is further configured to encode a sequence of signed integers.

13. The apparatus of claim 12, wherein each signed integer is a length of a packet in the current session SSH data traffic.

14. The apparatus of claim 13, wherein the hardware processor is further configured to encode a positive integer value for a packet length of a packet from a client in the current session SSH data traffic and to encode a negative integer value for a packet length of a packet from a server in the current session SSH data traffic.

15. The apparatus of claim 10, wherein the hardware processor is further configured to compare the at least one communication pattern of the current session SSH data traffic to a plurality of stored prior SSH sessions that each have one or more communication patterns that indicates a presence of human keystrokes in the stored prior SSH sessions.

16. The apparatus of claim 11, wherein the at least one communication pattern is one of a size of a packet in the vector, an order of the packets in the vector, a timing between packets in the vector and a direction of a packet.

17. The apparatus of claim 10, wherein the hardware processor is further configured to compare a variance in an inter-arrival delta for human keystrokes to a constant inter-arrival delta for keepalive messages.

18. A sensor appliance, comprising:
    a processor;

a plurality of lines of instructions executed by the processor that configure the processor to:

capture a current session secure shell (SSH) data traffic;

identify at least one communication pattern in a connection portion of the current session SSH data traffic, the at least one communication pattern being a command and a length of the command that indicate human keystrokes;

compare the at least one communication pattern of the current session SSH data traffic to a communication pattern of a stored SSH session being a past SSH session wherein the communication pattern of the past SSH session indicates a presence of human keystrokes in the past SSH session; and inferring a presence of human keystrokes in the current session SSH data traffic upon determining a match of the communication pattern of the current session SSH data traffic and the communication pattern of the past SSH session, wherein inferring the presence of human keystrokes further comprises distinguishing between the presence of human keystrokes and keepalive messages.

19. The appliance of claim 18, wherein the processor is further configured to encode the current session SSH data traffic into a vector and to identify the at least one communication pattern in the vector.

20. The appliance of claim 19, wherein the processor is further configured to encode a sequence of signed integers.

21. The appliance of claim 20, wherein each signed integer is a length of a packet in the current session SSH data traffic.

22. The appliance of claim 21, wherein the processor is further configured to encode a positive integer value for a packet length of a packet from a client in the current session SSH data traffic and to encode a negative integer value for a packet length of a packet from a server in the current session SSH data traffic.

23. The appliance of claim 18, wherein the processor is further configured to compare the at least one communication pattern of the current session SSH data traffic to a plurality of stored prior SSH sessions that each have one or more communication patterns that indicate a presence of human keystrokes in the stored prior SSH session.

24. The appliance of claim 19, wherein the at least one communication pattern is one of a size of a packet in the vector, an order of the packets in the vector, a timing between packets in the vector and a direction of a packet.

25. The appliance of claim 18, wherein the processor is further configured to compare a variance in an inter-arrival delta for human keystrokes to a constant inter-arrival delta for keepalive messages.

* * * * *